United States Patent [19]

Haferl

[11] Patent Number: 4,547,708
[45] Date of Patent: Oct. 15, 1985

[54] VARIABLE PICTURE SIZE CIRCUIT FOR A TELEVISION RECEIVER

[75] Inventor: Peter E. Haferl, Adliswil, Switzerland

[73] Assignee: RCA Corporation, Princeton, N.J.

[21] Appl. No.: 534,711

[22] Filed: Sep. 22, 1983

[30] Foreign Application Priority Data

Feb. 27, 1983 [GB] United Kingdom ............... 8304754

[51] Int. Cl.$^4$ ............................................. H01J 29/56
[52] U.S. Cl. .................................. 315/371; 315/411; 358/180
[58] Field of Search ............... 315/370, 371, 408, 411; 358/180, 77

[56] References Cited

U.S. PATENT DOCUMENTS 3,097,262 7/1963 Ehrenhaft .
3,235,767 2/1966 Bahring .
3,713,000 1/1973 Driskell et al. .
3,908,083 9/1975 Hiraki et al. .
4,028,726 6/1977 Argy .

FOREIGN PATENT DOCUMENTS 57206178 12/1982 Japan .

*Primary Examiner*—Theodore M. Blum
*Assistant Examiner*—Gregory C. Issing
*Attorney, Agent, or Firm*—Eugene M. Whitacre; Paul J. Rasmussen; Joseph J. Laks

[57] ABSTRACT

A horizontal deflection circuit periodically applies a horizontal trace voltage to a horizontal deflection winding for generating horizontal scanning current therein. A modulator circuit is responsive to control signals for varying the horizontal trace voltage to develop concurrent variations in the amplitude of the horizontal scanning current. A side pincushion control signal is applied to the modulator circuit to vary the horizontal trace voltage at a vertical rate for developing variations in the amplitude of the horizontal scanning current that produce side pincushion correction. A horizontal size control signal is applied to the modulator circuit to vary the horizontal trace voltage for changing the picture size in the horizontal direction. A vertical deflection circuit generates in a vertical deflection winding a vertical scanning current having an amplitude that varies with variations in a vertical size control signal for changing the picture size in the vertical direction.

11 Claims, 5 Drawing Figures

VARIABLE PICTURE SIZE CIRCUIT FOR A TELEVISION RECEIVER

This invention relates to a variable picture size circuit which permits the simultaneous variation of the height and width of a scanned raster. The tracking between height and width is kept proportional to maintain a constant picture aspect ratio. The circuit may be operated either locally or via a remote control and the viewer is provided with the impression of a zoom effect. The range of operation may be selected anywhere between underscan and overscan. High voltage or other like parameters of the television receiver are not influenced by the picture size variation.

In accordance with an aspect of the invention, the picture size control circuit is incorporated in a modulator circuit that is used to provide side pincushion correction for horizontal deflection. A horizontal size control signal is applied to the modulator circuit to vary the horizontal trace voltage for changing the picture size in the horizontal direction. A vertical deflection circuit generates in a vertical deflection winding a vertical scanning current having an amplitude that varies with variations in a vertical size control signal for changing the picture size in the vertical direction.

In accordance with another aspect of the invention, the vertical size control signal is generated from a voltage developed within the horizontal deflection circuit that varies concurrently with variations in the horizontal trace voltage. Thus, changes in vertical size track with changes in horizontal size to maintain a constant aspect ratio picture.

Figure 1:
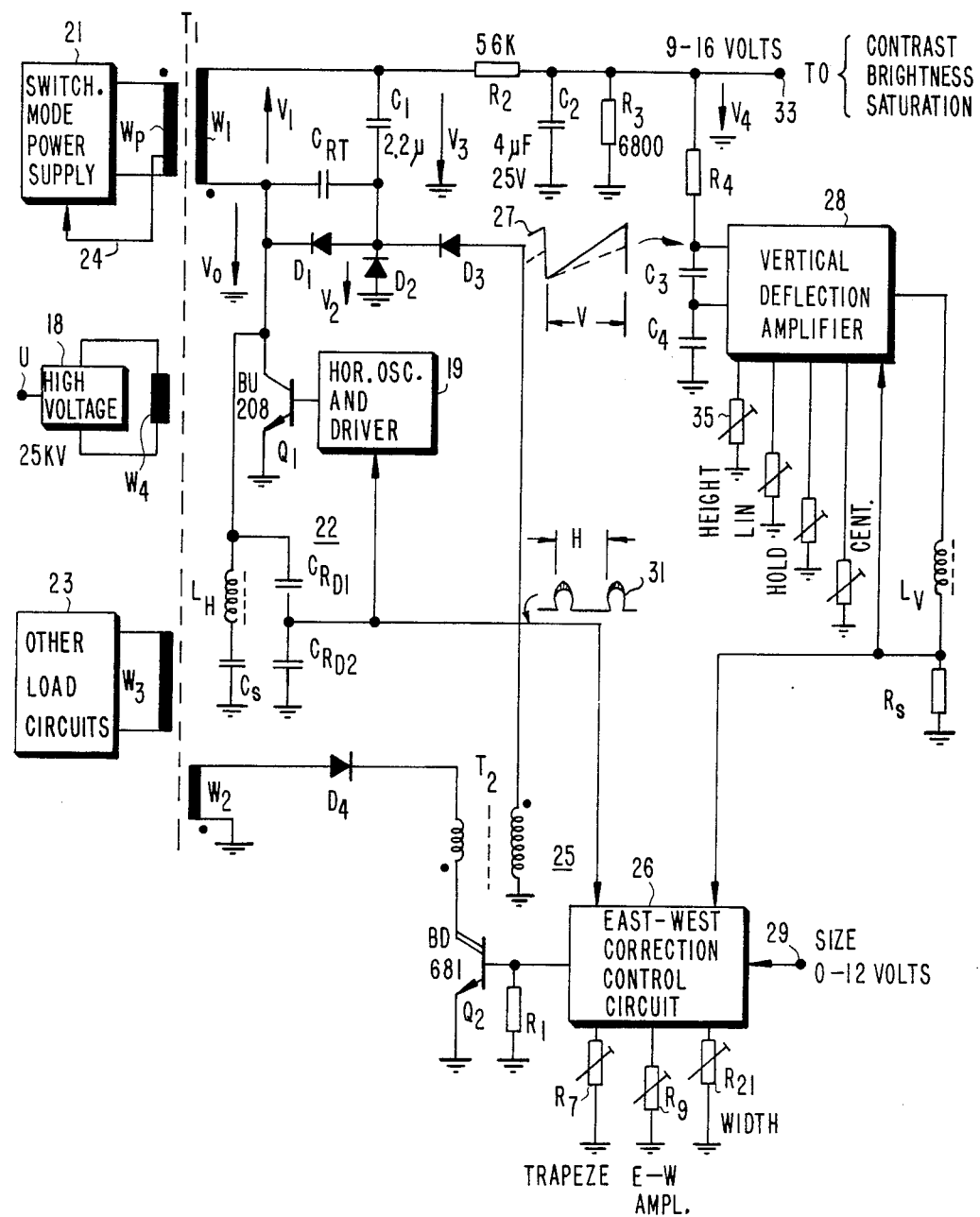
FIG. 1 illustrates a variable picture size circuit for a television receiver embodying the invention.

The variable picture size circuit embodying the invention is illustrated in FIG. 1 as being incorporated as part of a power supply and deflection circuit that provides side or east-west pincushion correction. Such power supply and deflection circuit is described in U.S. Pat. No. 4,484,113, filed Dec. 22, 1981, entitled REGULATED DEFLECTION CIRCUIT, by P. E. Haferl and in the U.S. Pat. No. 4,429,257, filed Sept. 29, 1982, entitled VARIABLE HORIZONTAL DEFLECTION CIRCUIT CAPABLE OF PROVIDING EAST-WEST PINCUSHION CORRECTION, by P. E. Haferl, both applications herein incorporated by reference.

Figure 3:
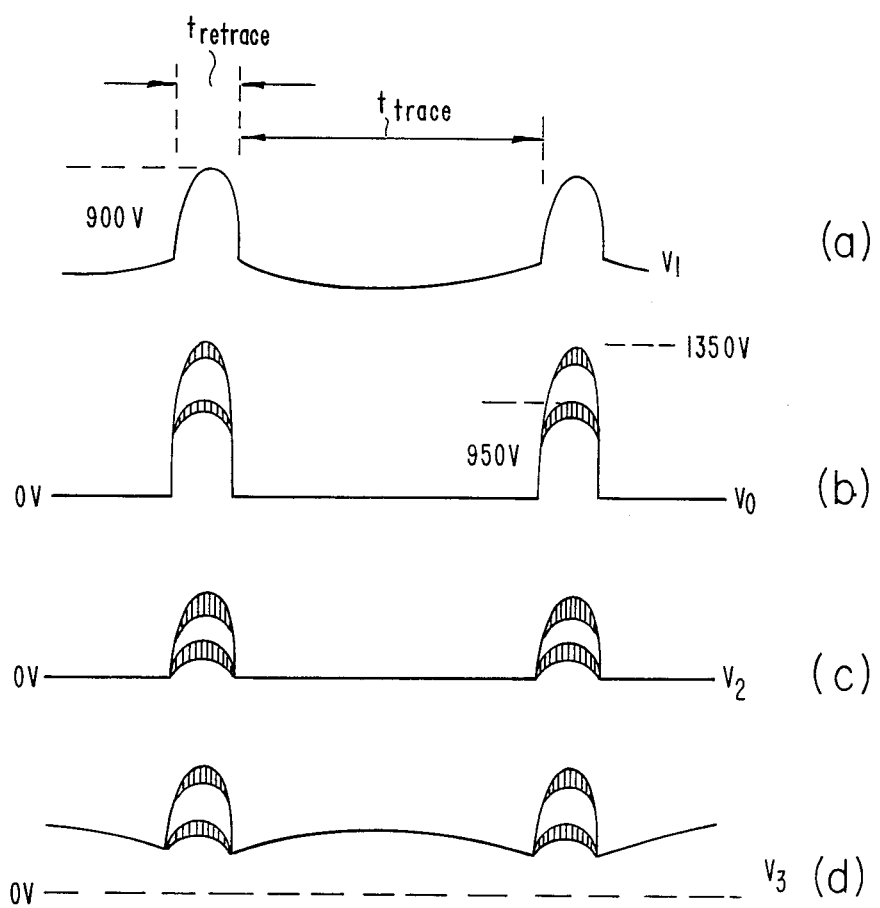
FIG. 3 illustrates waveforms useful in explaining the operation of the circuit of FIG. 1.

In FIG. 1, a television receiver line synchronous switched mode power supply 21 provides energy or power, via a supply inductance, horizontal flyback transformer $T_1$, to the horizontal deflection circuit 22 coupled to winding $w_1$ of the flyback transformer. A horizontal deflection retrace pulse voltage $V_0$, illustrated in FIG. 3b, is developed by horizontal deflection circuit 22 at the collector of horizontal output transistor $Q_1$ operated at a horizontal deflection rate by a horizontal oscillator and driver circuit 19. The deflection retrace pulse voltage is developed by a horizontal deflection retrace resonant circuit comprising horizontal deflection winding $L_H$ and horizontal deflection retrace capacitors $C_{RD1}$ and $C_{RD2}$.

During horizontal retrace, the inductance of winding $w_1$ of transformer $T_1$ and a retrace capacitor $C_{RT}$ form a second resonant circuit tuned to near the horizontal deflection retrace frequency. A pulse voltage $V_1$, illustrated in FIG. 3a, is developed across winding $w_1$.

The flyback transformer retrace pulse voltage $V_1$ is transformer coupled to the other windings, $w_2-w_4$, of the flyback transformer. The voltage across high voltage winding $w_4$ energizes a high voltage circuit 18 to produce an ultor voltage at a terminal U. The voltage across winding $w_3$ energizes various other television receiver load circuits collectively illustrated in FIG. 1 as element 23. The primary winding $w_p$ of flyback transformer $T_1$ is tapped and the tap signal is fed back along a line 24 to switched mode power supply 21 to synchronize operation of the power supply with horizontal deflection and to regulate the flyback transformer retrace pulse voltage $V_1$ and maintain its amplitude constant.

A side pincushion correction modulator circuit 25 is coupled to horizontal deflection circuit 22 for providing side pincushion correction to the horizontal scanning current flowing in horizontal deflection winding $L_H$. Modulator circuit 25 stores energy obtained from flyback transformer winding $w_2$ during the horizontal trace interval. This energy is transferred to horizontal deflection circuit 22 during the horizontal retrace interval by way of the secondary winding of transformer $T_2$ and diode $D_3$. A retrace pulse voltage $V_2$, illustrated in FIG. 3c, is developed across a diode $D_2$, which diode is part of a horizontal damper diode arrangement comprising diodes $D_1$ and $D_2$. The deflection retrace pulse voltage $V_0$ equals the algebraic sum of the voltage $V_2$ and the flyback transformer pulse voltage $V_1$.

Modulator circuit 25 varies the amplitude of the voltage $V_2$ at a vertical rate in a parabolic manner to modulate the deflection retrace pulse voltage $V_0$ at a vertical rate in a parabolic manner. The result is that modulator circuit 25 concurrently varies the horizontal trace voltage that is applied to horizontal deflection winding $L_H$ by S-shaping capacitor $C_s$ during the switching operation of horizontal output transistor $Q_1$ and damper diodes $D_1$ and $D_2$.

The flyback transformer retrace pulse voltage $V_1$ remains unmodulated in amplitude because of the regulation provided by switched mode power supply 21. High voltage and other transformer voltages are not affected by the east-west modulation or by raster width adjustments performed through control circuit 26 of modulator 25. Similarly, because the secondary winding of transformer $T_2$ is interposed between the horizontal deflection and flyback transformer retrace resonant circuits, the winding serves to isolate the two resonant circuits during retrace at the deflection retrace and higher frequencies. Thus, load current modulation of the waveshape of the pulse voltage $V_1$, leaves the waveshape of the voltage $V_0$ relatively unaffected.

The voltage $V_3$ measured from the undotted terminal of flyback transformer winding $w_1$ to ground comprises the algebraic sum of the voltages $V_1$ and $V_0$ as illustrated in FIG. 3d. The voltage $V_3$ is, therefore, also modulated by modulator circuit 25 and varies with variations in the horizontal scanning current. The voltage $V_3$ increases with increased horizontal scanning current amplitude or raster width.

In accordance with an aspect of the invention, the voltage $V_3$ is used to generate the vertical sawtooth ramp voltage, waveform 27 of FIG. 1, used by vertical deflection amplifier 28 to generate vertical scanning current in vertical deflection winding $L_V$.

Resistor $R_2$ and $R_3$ divide down the voltage $V_3$, and capacitor $C_2$ filters from the divided voltage $V_3$ horizontal frequency components and the vertical rate variation introduced by modulator 25. A voltage $V_4$ is produced at a terminal 33 that is proportional to the DC value of voltage $V_3$. The DC value of the voltage $V_3$ is controlled by the width control potentiometer $R_{21}$ of control circuit 26 and is further controlled by a size control voltage applied to control circuit 26 at a terminal 29. The size control voltage may be developed locally by means of manual adjustment of a potentiometer or may be generated remotely by conventional infrared or ultrasonic remote control circuitry similar to remote sound control circuitry.

The size control signal at terminal 29 directly determines the amplitude of the horizontal scanning current by directly controlling the amplitude of the deflection retrace pulse voltage $V_0$ by means of operation of modulator circuit 25. Indirectly, however, since the voltages $V_3$ and $V_4$ are proportional to the voltage $V_0$, the size control signal at terminal 29, in addition to acting as a horizontal size control signal, also acts to enable the voltage $V_4$ to function as a vertical size control signal for the vertical scanning current in vertical deflection winding $L_V$.

A vertical ramp forming circuit comprising resistor $R_4$ and capacitors $C_3$ and $C_4$ is coupled to vertical deflection amplifier 28. Capacitors $C_3$ and $C_4$ are charged from terminal 33 to produce a sawtooth ramp, waveform 27, during the vertical trace interval having an amplitude that is proportional to the voltage $V_4$. To initiate the vertical retrace interval, vertical deflection amplifier 28 discharges capacitors $C_3$ and $C_4$ in a conventional manner.

In addition to picture size control circuitry embodying the invention, width control potentiometer $R_{21}$ for horizontal deflection circuit 22 and a height control potentiometer 35 for vertical deflection amplifier 28 are provided that act independently of the size control signals being developed. Potentiometer 35, by way of illustration, can adjust picture height by controlling the amount of AC feedback of the sawtooth voltage developed by sampling resistor $R_s$ of FIG. 1.

During width and height adjustment, the picture size control signal developed at terminal 29 is set to some nominal level. Width and height are then adjusted at the normal picture size condition. After the width and height adjustments have been completed, the size control signal level may be changed independently of width and height adjustment to the level required for producing the desired larger or smaller picture size.

The range of picture size variation is limited at the lower end, smallest size, by the value of the voltage $V_1$, which voltage places a lower limit on the horizontal deflection current amplitude. The range is limited at the higher end by the amplitude of the voltage developed across flyback transformer winding $w_2$ and by the turns ratio of transformer $T_2$. Both factors determine the maximum energy that may be supplied to horizontal deflection winding $L_H$ during each horizontal retrace interval. Another limitation to the maximum picture size is the maximum voltage that horizontal output transistor $Q_1$ is capable of withstanding.

Because the voltage $V_4$ is proportional to the picture size, the voltage may be applied to conventional contrast, brightness and color saturation circuits not illustrated in FIG. 1 for adjusting contrast, color saturation and brightness with variations in picture size.

Figure 2:
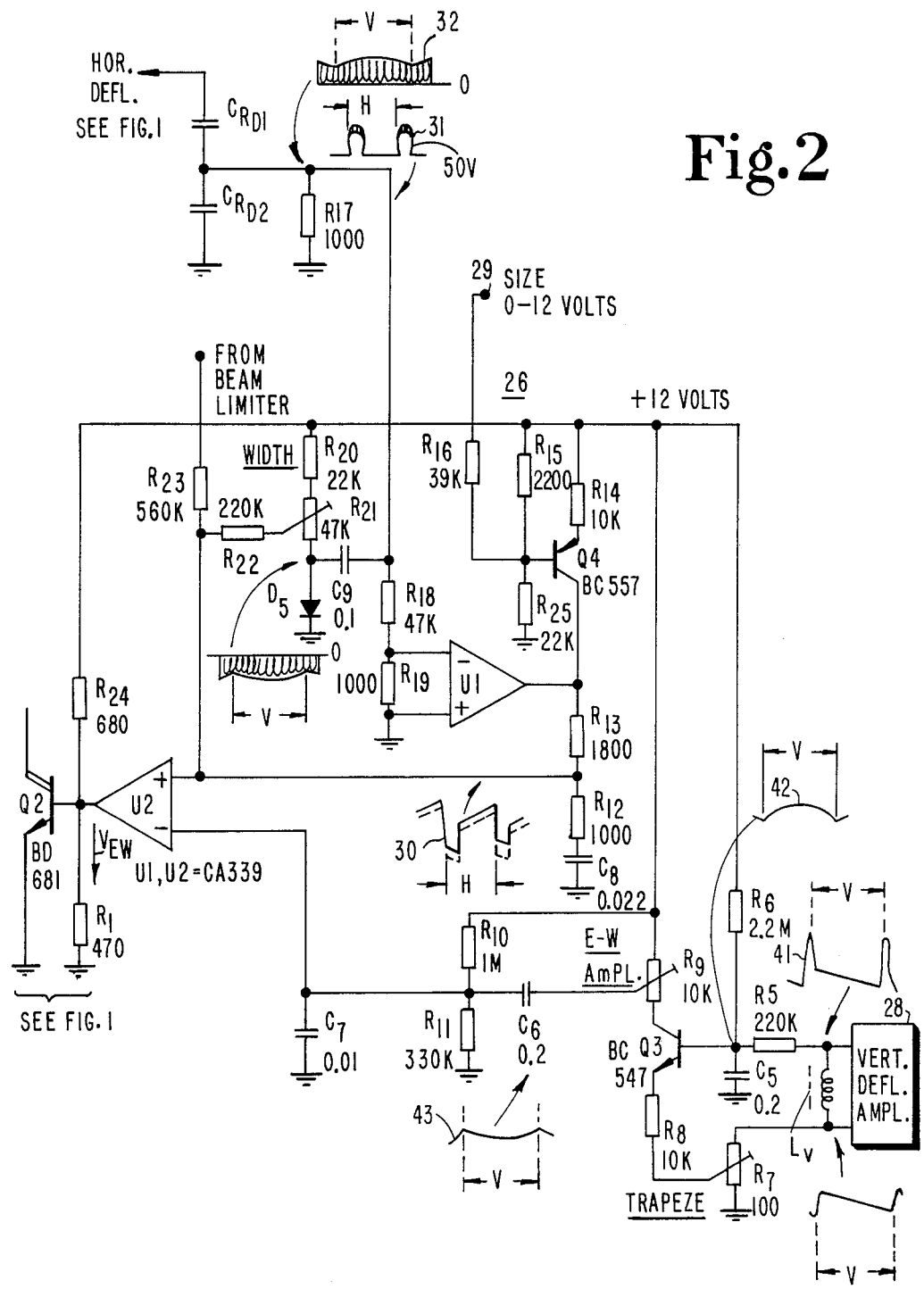
FIG. 2 illustrates a specific embodiment of the east-west raster correction control circuit of FIG. 1 that includes variable picture size control capability.

FIG. 2 illustrates a portion of the circuit of FIG. 1 including a specific embodiment of east-west pincushion correction modulator circuit 25 having picture size control capability in accordance with the invention. Items identified similarly in the two figures function similarly or represent similar quantities.

To provide east-west pincusion correction, transistor $Q_2$ of modulator circuit 25 of FIG. 1 is pulse width modulated at a vertical rate in a parabolic manner by control circuit 26 of FIG. 2. The vertical sawtooth voltage 41 developed by vertical deflection winding $L_v$ is integrated to obtain a vertical parabola signal 42 across capacitor $C_5$. The parabola is inverted and amplified by transistor $Q_3$. Some vertical sawtooth voltage is applied to the emitter of transistor $Q_3$ via the trapeze control resistor $R_7$ to avoid the development of a slight tilt to the parabola signal 43. The amplitude of the symmetrical, inverted parabola signal 43 is adjusted by resistor $R_9$ and applied via the DC blocking capacitor $C_6$ to the inverting input terminal of a comparator U2.

A capacitor $C_8$ is charged from a current source $Q_4$ and is discharged each horizontal retrace interval by a comparator U1 to which horizontal deflection retrace pulses 31 are applied. A horizontal ramp signal 30 is thereby developed. Horizontal ramp signal 30 is coupled to the noninverting input terminal of comparator U2 and is compared with the vertical parabola at the inverting input terminal to produce, during each horizontal deflection cycle, a rectangular wave switching signal, $V_{EW}$, at the comparator output. The positive going edge of $V_{EW}$ occurrs during the horizontal trace interval at a controllable, variable instant to produce pulse width modulation of $V_{EW}$ at a vertical rate in a parabolic manner. The switching signal is applied to the base of switching transistor $Q_2$ for providing east-west pincushion correction.

Picture size is controlled by the variable current source $Q_4$, by which a variable DC voltage may be added to the horizontal ramp waveform 30 of FIG. 2. The solid line waveform of ramp 30 is obtained with a low level picture size control signal applied to terminal 29, resulting in an expanded picture. The dashed line waveform of ramp 30 is obtained with a high level control signal and results in a contracted picture.

A feedback circuit has been incorporated into the east-west pincushion correction modulator control circuit 26 to improve picture geometry and stability. The deflection retrace pulse voltage developed across resistor $R_{17}$ is illustrated in FIG. 2 as waveform 31 at a scale associated with a horizontal rate and as waveform 32 at a scale associated with vertical rate. The deflection retrace pulse voltage contains the east-west modulation as indicated by the envelope of the waveform 32. The deflection retrace pulse voltage is mirrored at ground reference by capacitor $C_9$ and diode $D_5$ and is added via width control resistors $R_{21}$, $R_{22}$ to the horizontal ramp voltage developed by integrating capacitor $C_8$.

If the vertical parabola and/or the DC component added via the feedback circuit to the positive input of amplifier U2 is unequal to the drive signal at the negative input, then the timing of the switching signal at the output of amplifier U2 will change such that the error decreases.

By this feedback mechanism, beam current variations or audio loading on flyback transformer $T_1$ of FIG. 1 do not influence east-west correction, width, or picture size as will now be further exaplained. Supposing $Q_2$ is continuousely cut off, the picture is then smallest and east-west correction is zero. In this condition horizontal deflection winding $L_H$ is driven by the flyback transformer retrace voltage which generates a drive current through diode $D_2$ and $L_H$. This current primarily passes during the first half of retrace and therefore does not greatly disturb the deflection winding current. Some load modulations, however, may be visible.

When $Q_2$ is in operation, the additional drive power for east-west correction and size is taken from transformer winding $W_2$ which contains all the load modulation disturbances. An open-loop operation of the modulator would re-introduce these disturbances into horizontal deflection circuit 22. Further, open-loop operation would require a carefully shaped horizontal rate ramp in the modulator to obtain raster linearity over the entire width or size range.

Thus the feedback serves to prevent re-introduction of loading effects via winding $W_2$. Further, geometry is improved because the horizontal ramp of the modulator requires no particular shaping. Stability is improved because the dc component is included in the feedback. This results in a smooth width or size adjustment.

Control circuit 26 of FIG. 2 additionally has a direct input of beam current information to the positive input terminal of amplifier U2 through resistor $R_{23}$. The beam current information may be obtained from any convenient point in the television receiver such as from the conventional beam limiter input. As the beam current is increased, for example, the ultor voltage decreases tending to cause an increase in picture size. To directly compensate for this effect, the beam current information is added via resistor $R_{23}$ to the horizontal ramp 30 of FIG. 2 in a manner that results in east-west pincushion correction modulator circuit 25 reducing the amplitudes of the horizontal and vertical scanning currents, resulting in a stable picture size with beam current variations.

The power consumption of the east-west pincushion correction modulator circuit 25, incorporating picture size control embodying the invention, is proportional to the amplitudes of the horizontal and vertical scanning current. Thus, no extra power is dissipated by this circuit at normal picture size when compared to a modulator circuit that does not incorporate picture size control.

Figure 4:
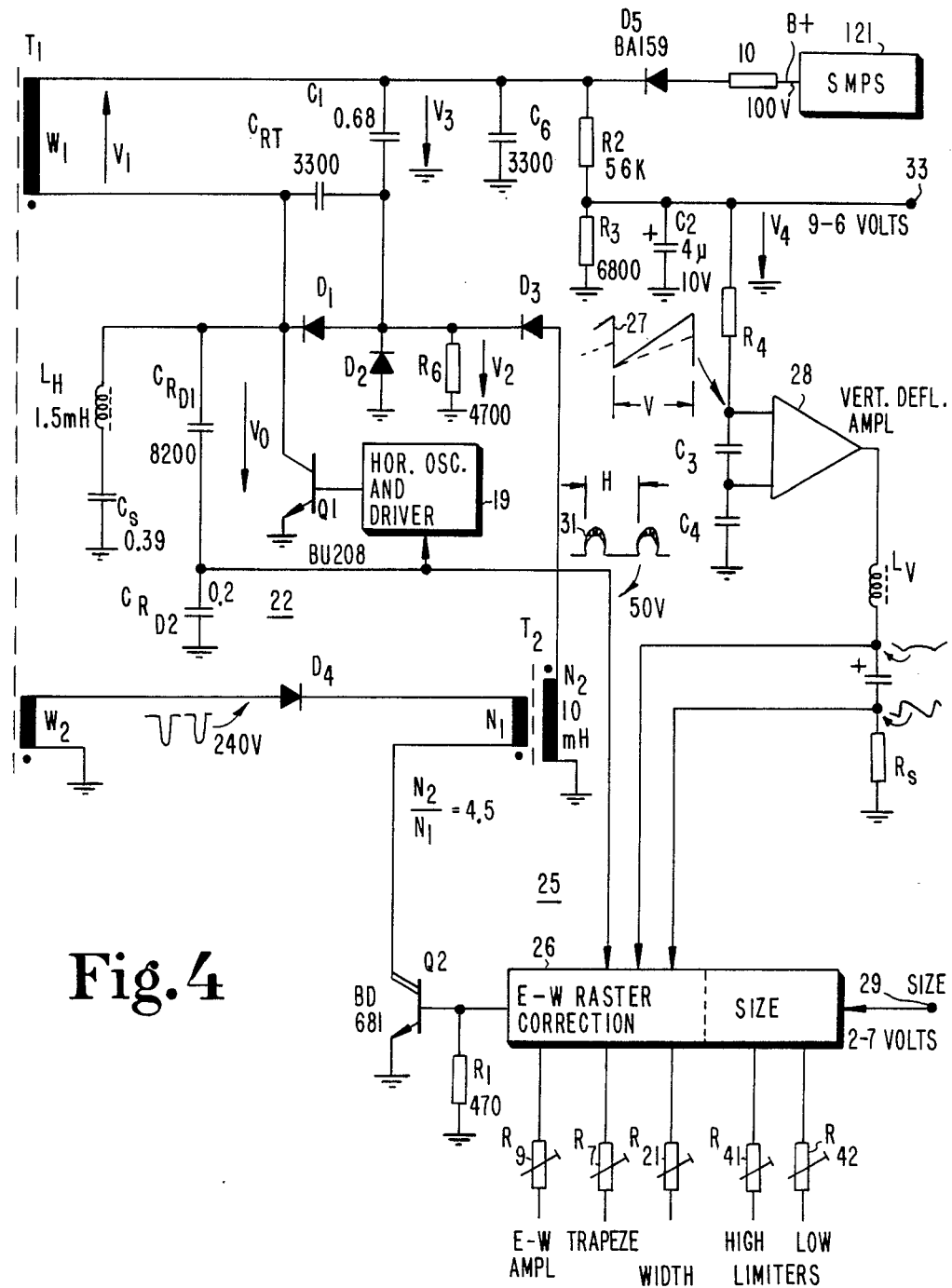
FIG. 4 illustrates another embodiment of a variable picture size circuit embodying the invention.

FIG. 4 illustrates another embodiment of a variable picture size circuit embodying the invention. Items identified similarly in FIG. 1 and 4 function similarly or represent similar quantities. In FIG. 4, horizontal deflection circuit 22 is powered from a regulated B+ voltage source, switched mode power supply 121. In such a deflection circuit, the energy circulating in flyback transformer $T_1$ is substantially lower than in the flyback transformer of the deflection circuit of FIG. 1. Ordinarily, the low circulating energy in the flyback transformer of FIG. 4 results in poor ultor voltage source impedance. This problem is solved by adding a capacitor $C_6$ between ground and the undotted terminal of primary winding $w_1$ of flyback transformer $T_1$.

Capacitor $C_6$ provides a high frequency current return to ground. The ultor voltage supply current, having frequencies that include the harmonics of the deflection retrace frequency, circulates during the horizontal deflection retrace interval between horizontal deflection circuit 22 and flyback transformer $T_1$ via capacitor $C_6$. This arrangement substantially improves the ultor voltage source impedance. Diode $D_5$ serves to disconnect horizontal deflection circuit 22 during retrace from the regulated B+ voltage supply when the voltage $V_3$ increases above the B+ voltage.

Figure 5:
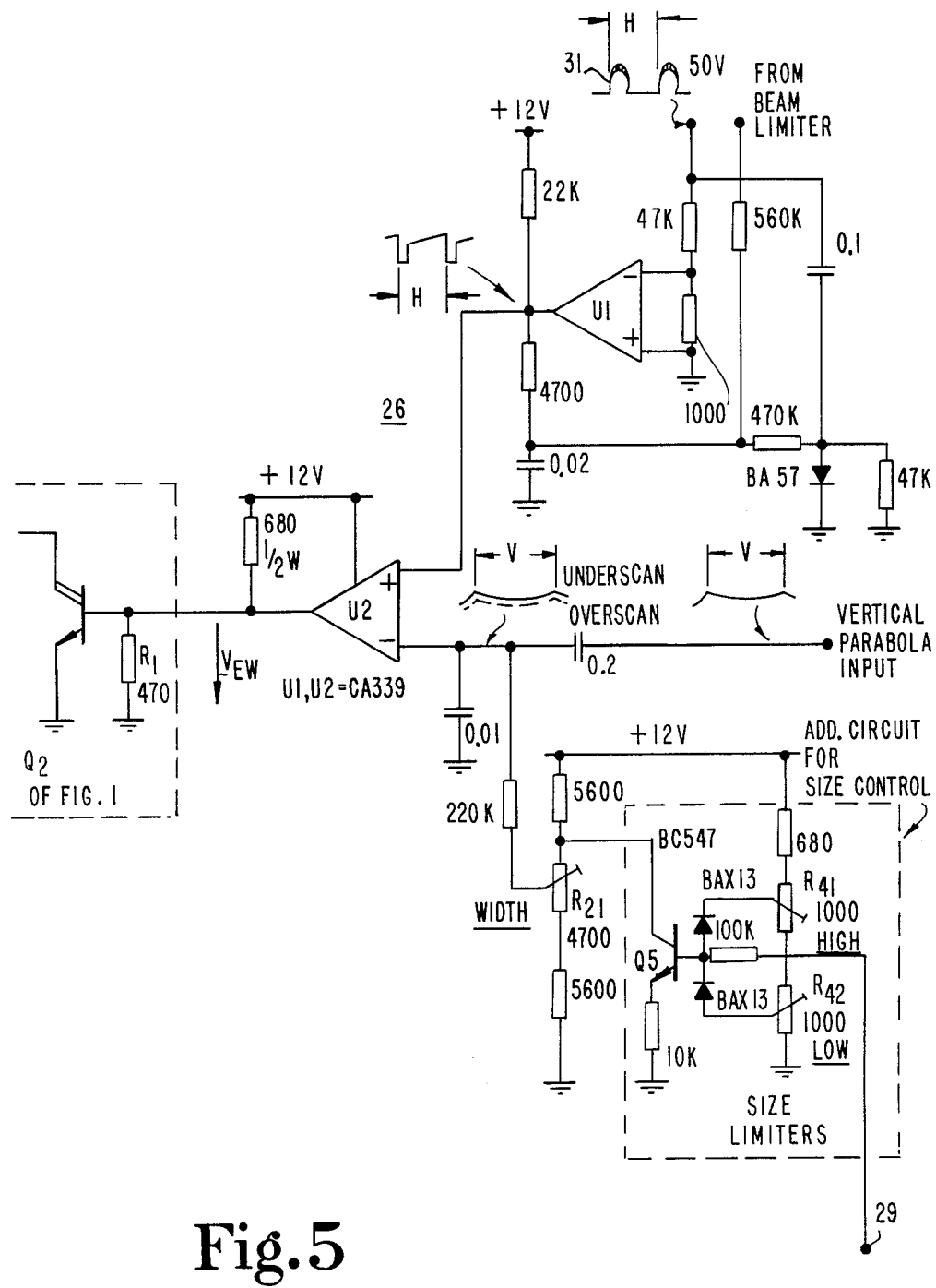
FIG. 5 illustrates a specific embodiment of the east-west raster correction control circuit of FIG. 4 that includes picture size control capability.

FIG. 5 illustrates a specific embodiment of east-west raster correction control circuit 26 of FIG. 4. Items identified similarly in the control circuits of FIGS. 2 and 5 function similary or represent similar quantities. In FIG. 5, the size control voltage developed at terminal 29 is fed via an inverter transistor $Q_5$ to the inverting input of comparator U2. Additionally, two size limiter potentiometers, $R_{41}$ and $R_{42}$, have been added. These potentiometers determine the range of the size control. The limiter potentiometers prevent the east-west modulator circuit from being driven into saturation or cutoff due to excessive adjustment of the size control circuit. Raster correction cannot be performed when the modulator is driven into saturation or cutoff.

A typical picture size range capability of the circuit of FIGS. 1 and 2 using a 110° picture tube, 26 inch screen, with an S4 yoke is as follows: 30% overscan capability; 20% underscan capability.

What is claimed is:

1. A picture size control circuit for a television raster display system comprising:
    a horizontal deflection winding;
    a horizontal deflection circuit for periodically applying a horizontal trace voltage to said horizontal deflection winding to generate horizontal scanning current therein;
    a modulator circuit responsive to control signals for varying said horizontal trace voltage to develop concurrent variations in the amplitude of said horizontal scanning current;
    means for generating a side pincushion control signal that is applied to said modulator circuit to vary said horizontal trace voltage at a vertical rate for developing variations in the amplitude of said horizontal scanning current that produce side pincushion correction;
    means for generating a horizontal size control signal that is applied to said modulator circuit to vary said horizontal trace voltage for changing the picture size in the horizontal direction;
    a vertical deflection winding;
    means for generating a second control signal indicative of changes in the picture size in the horizontal direction; and
    a vertical deflection circuit responsive to said second control signal for generating in said vertical deflection winding a vertical scanning current having an amplitude that varies with variations in said second control signal for changing the picture size in the vertical direction.

2. A picture size control circuit according to claim 1 including means for adjusting the width of said raster independently of the horizontal size control signal that is applied to said modulator circuit.

3. A picture size control circuit according to claim 1 including means for adjusting the height of said raster independently of the vertical size control signal being generated.

4. A picture size control circuit according to claim 1 wherein said means for generating a second control signal comprises means coupled to said horizontal deflection winding for generating a voltage that varies concurrently with the variations in said horizontal trace voltage that are produced by said horizontal size control signal.

5. A picture size control circuit according to claim 4 including means for generating a modulator control signal representative of variations in beam current to concurrently vary the amplitudes of said horizontal and vertical scanning currents so as to stabilize picture width and height with said beam current variations.

6. A picture size control circuit according to claim 4 including means for adjusting the width and height of said raster independently of the horizontal and vertical size control signals being generated.

7. A picture size control circuit according to claim 1 wherein said deflection circuit includes switching means operated at a horizontal deflection rate for periodically applying said horizontal trace voltage to said horizontal deflection winding and a horizontal deflection retrace capacitance for forming a horizontal deflection retrace resonant circuit with said horizontal deflection winding, and including an inductance coupled to a source of supply energy and a second capacitance coupled to said inductance and to said switching means for forming a second resonant circuit within said horizontal retrace interval to generate a pulse voltage that energizes a load circuit and wherein said modulator circuit includes an impedance interposed within said horizontal retrace interval in a current path between said deflection retrace and second resonant circuits and a source of modulation current coupled to said impedance and responsive to said side pincushion and horizontal size control signals for producing modulation of said horizontal scanning current as said modulation current varies.

8. A picture size control circuit for a television receiver, comprising;
  a horizontal deflection winding;
  horizontal switching means coupled to said deflection winding and operated at a horizontal deflection rate to generate scanning current in said deflection winding during a horizontal trace interval of a horizontal deflection cycle;
  a horizontal deflection retrace capacitance for forming a horizontal deflection retrace resonant circuit with said deflection winding to produce a horizontal deflection retrace pulse voltage during a horizontal retrace interval of said deflection cycle;
  a source of supply energy;
  a supply inductance coupled to said source;
  a second capacitance coupled to said supply inductance and to said switching means for forming a second resonant circuit with said supply inductance within said horizontal retrace interval to generate a second pulse voltage;
  a load circuit energized by said pulse voltage;
  an impedance interposed during said horizontal retrace interval in a current path between said horizontal deflection retrace and second resonant circuits;
  a source of modulation current coupled to said impedance and responsive to control signals for producing modulation of said horizontal scanning current as said modulation current varies;
  means for adjusting the width of said raster;
  means operating independently of said width adjusting means for generating a horizontal size control signal for varying said modulation current to change the picture size in the horizontal direction;
  a vertical deflection winding;
  means for generating a vertical size control signal; and
  a vertical deflection circuit responsive to said vertical size control signal for generating in said vertical deflection winding a vertical scanning current having an amplitude that varies with variations in said vertical size control signal for changing the picture size in the vertical direction.

9. A picture size control circuit according to claim 8 wherein said impedance isolates the two resonant circuits from each other to reduce the modulation of the pulse voltage generated by one resonant circuit due to the effects of loading on the other resonant circuit.

10. A picture size control circuit according to claim 9 wherein said means for generating a vertical size control signal comprises means coupled to said horizontal deflection winding for generating a voltage that varies concurrently with the variations in said horizontal scanning current that are produced by said horizontal size control signal.

11. A picture size control circuit according to claim 10 including means for feeding back said deflection retrace pulse voltage to said source of modulation current to provide closed-loop correction to said scanning current.

* * * * *

UNITED STATES PATENT AND TRADEMARK OFFICE
CERTIFICATE OF CORRECTION

PATENT NO. : 4,547,708

DATED : October 15, 1985

INVENTOR(S) : Peter Eduard Haferl

It is certified that error appears in the above-identified patent and that said Letters Patent is hereby corrected as shown below:

On the title sheet, for Foreign Application Priority Data change Feb. 27, 1983 to Feb. 21, 1983.

Signed and Sealed this

Twenty-ninth Day of July 1986

[SEAL]

Attest:

Attesting Officer

DONALD J. QUIGG

Commissioner of Patents and Trademarks